US012649439B1

(12) United States Patent
Jha

(10) Patent No.: US 12,649,439 B1
(45) Date of Patent: Jun. 9, 2026

(54) VEHICLE HAVING BIOMETRIC AUTHENTICATION SENSOR

(71) Applicant: FCA US LLC, Auburn Hills, MI (US)

(72) Inventor: Aman Kumar Jha, Chennai (IN)

(73) Assignee: FCA US LLC, Auburn Hills, MI (US)

( * ) Notice: Subject to any disclaimer, the term of this patent is extended or adjusted under 35 U.S.C. 154(b) by 15 days.

(21) Appl. No.: 18/973,521

(22) Filed: Dec. 9, 2024

(51) Int. Cl.
*B60R 25/40* (2013.01)
*B60J 5/04* (2006.01)
*B60R 25/25* (2013.01)

(52) U.S. Cl.
CPC ........... *B60R 25/252* (2013.01); *B60J 5/0493* (2013.01); *B60R 25/403* (2013.01)

(58) Field of Classification Search
CPC ..... B60R 25/252; B60R 25/403; B60J 5/0493
See application file for complete search history.

(56) References Cited

U.S. PATENT DOCUMENTS

| | | | |
|---|---|---|---|
| 3,205,863 A | 9/1965 | Nolan | |
| 7,108,301 B2 * | 9/2006 | Louvel | E05B 85/103 292/201 |

| | | | |
|---|---|---|---|
| 7,388,473 B2 | 6/2008 | Teshima et al. | |
| 11,085,212 B2 * | 8/2021 | Rivaya | E05B 81/76 |
| 2004/0041690 A1 * | 3/2004 | Yamagishi | G07C 9/00563 340/5.52 |
| 2004/0262945 A1 * | 12/2004 | Suzuki | E05B 77/46 296/155 |

FOREIGN PATENT DOCUMENTS

| | | | |
|---|---|---|---|
| CN | 211196137 U | | 8/2020 |
| CN | 214001910 U | * | 8/2021 |
| DE | 10047639 A1 | | 10/2001 |

* cited by examiner

*Primary Examiner* — Nay Tun
(74) *Attorney, Agent, or Firm* — Jeremy J. Klobucar

(57) ABSTRACT

An authentication system configured to be attached to a door and configured to authenticate whether a person is permitted to open the door. The authentication system may include a casing configured to be attached to the door, a device configured to generate a signal indicative of the person being authentic, and a protection member that is movable relative to the casing and is configured shield the device when the protection member is located at a first position and expose the device when the protection member is at a second and different position, wherein the protection member is configured to receive a first axial force that moves the protection member from the first position to the second position to expose the device, and receive a second axial force that moves the protection member from the second position back to the first position.

14 Claims, 8 Drawing Sheets

10

18

20

12

14    16, 16a

VEHICLE HAVING BIOMETRIC AUTHENTICATION SENSOR

FIELD

The present disclosure relates to a vehicle having a biometric sensor.

BACKGROUND

This section provides background information related to the present disclosure which is not necessarily prior art.

Biometric authentication is commonly used to gain access in various consumer product devices such as cellular phones, computers, and the like. Use of this technology to gain entry into a vehicle, however, has been challenging. For example, if the biometric authentication device (e.g., fingerprint sensor) gets dirty or wet, accuracy of the biometric authentication device can be reduced. In addition, the device must consume a low amount or no power when the vehicle is not operating. It is desirable, therefore, for a biometric authentication system that can be used on a vehicle that provides protection to the biometric authentication device from the environment to avoid reduced accuracy of the device, and that only consumes power when needed.

SUMMARY

This section provides a general summary of the disclosure, and is not a comprehensive disclosure of its full scope or all of its features.

According to a first aspect of the present disclosure, there is provided a vehicle that includes a vehicle body having a door attached thereto for providing access to an interior of the vehicle; an authentication system attached to the door that is configured to authenticate whether a person is permitted to open the door and access the interior of the vehicle; and a controller in communication with the authentication system and in communication with a door lock actuation mechanism, the controller being configured to actuate the door lock actuation mechanism upon receipt of a signal from the authentication system that is indicative of the person being authentic, wherein the authentication system includes a casing attached to the door, a device configured to generate the signal indicative of the person being authentic, and a protection member that is movable relative to the casing and is configured shield the device when the protection member is located at a first position and expose the device when the protection member is at a second and different position, wherein the protection member is configured to receive a first axial force that moves the protection member from the first position to the second position to expose the device, and receive a second axial force that moves the protection member from the second position back to the first position.

According to the first aspect, the vehicle may also include a battery that is configured to provide a current or a voltage to the device that is configured to generate the signal indicative of the person being authentic.

According to the first aspect, the vehicle may also include a wiring conduit attached to the casing and having a first wiring provided therein; a second wiring attached to the protection member; and a wiring line that connects the second wiring to the device that is configured to generate the signal indicative of the person being authentic, wherein the first wiring is not in electrical contact with the second wiring when the protection member is located at the first position, the first wiring is in electrical communication with the second wiring when the protection member is located at the second position, and when the first wiring is in electrical communication with the second wiring, the current or voltage provided by the battery is communicated to the device by the wiring line.

According to the first aspect, the device configured to generate the signal indicative of the person being authentic is a fingerprint sensor.

According to the first aspect, the protective member is attached to a movement mechanism including a movable cam body that enables the protection member to move from the first position to the second position.

According to the first aspect, the movable cam body is rotatably and axially slidably disposed within a stationary guide member.

According to the first aspect, the protection member includes a plunger section integral therewith, the plunger section having a pair of diametrically opposite fingers formed integrally with the plunger section and extending outward therefrom to engage the movable cam body.

According to the first aspect, the cam body includes a plurality of cam surfaces that are engageable with the pair of fingers.

According to the first aspect, engagement and disengagement of the pair of fingers with a pair of the plurality of cam surfaces axially displaces and rotates the movable cam body.

According to a second aspect of the present disclosure, there is provided an authentication system configured to be attached to a door and configured to authenticate whether a person is permitted to open the door. The authentication system may include a casing configured to be attached to the door, a device configured to generate a signal indicative of the person being authentic, and a protection member that is movable relative to the casing and is configured shield the device when the protection member is located at a first position and expose the device when the protection member is at a second and different position, wherein the protection member is configured to receive a first axial force that moves the protection member from the first position to the second position to expose the device, and receive a second axial force that moves the protection member from the second position back to the first position.

According to the second aspect, the device that is configured to generate the signal indicative of the person being authentic is in electrical communication with a battery when the protection member is in the second position.

According to the second aspect, the authentication system may further include a wiring conduit attached to the casing and having a first wiring provided therein; a second wiring attached to the protection member; and a wiring line that connects the second wiring to the device that is configured to generate the signal indicative of the person being authentic, wherein the first wiring is not in electrical contact with the second wiring when the protection member is located at the first position, the first wiring is in electrical communication with the second wiring when the protection member is located at the second position, and when the first wiring is in electrical communication with the second wiring, the current or voltage provided by the battery is communicated to the device by the wiring line.

According to the second aspect, the device configured to generate the signal indicative of the person being authentic is a fingerprint sensor.

According to the second aspect, the protective member is attached to a movement mechanism including a movable cam body that enables the protection member to move from the first position to the second position.

According to the second aspect, the movable cam body is rotatably and axially slidably disposed within a stationary guide member.

According to the second aspect, the protection member includes a plunger section integral therewith, the plunger section having a pair of diametrically opposite fingers formed integrally with the plunger section and extending outward therefrom to engage the movable cam body.

According to the second aspect, the cam body includes a plurality of cam surfaces that are engageable with the pair of fingers.

According to the second aspect, engagement and disengagement of the pair of fingers with a pair of the plurality of cam surfaces axially displaces and rotates the movable cam body.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8-11 are schematic illustrations of a cam member and a plunger depicting axial and rotational movement of the cam member by the plunger; and FIGS. 9-15 are cross-sectional views of the cam member and portions of the plunger illustrated in FIGS. 8-11 at positions that that correspond to the views shown in FIGS. 8-11, respectively.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
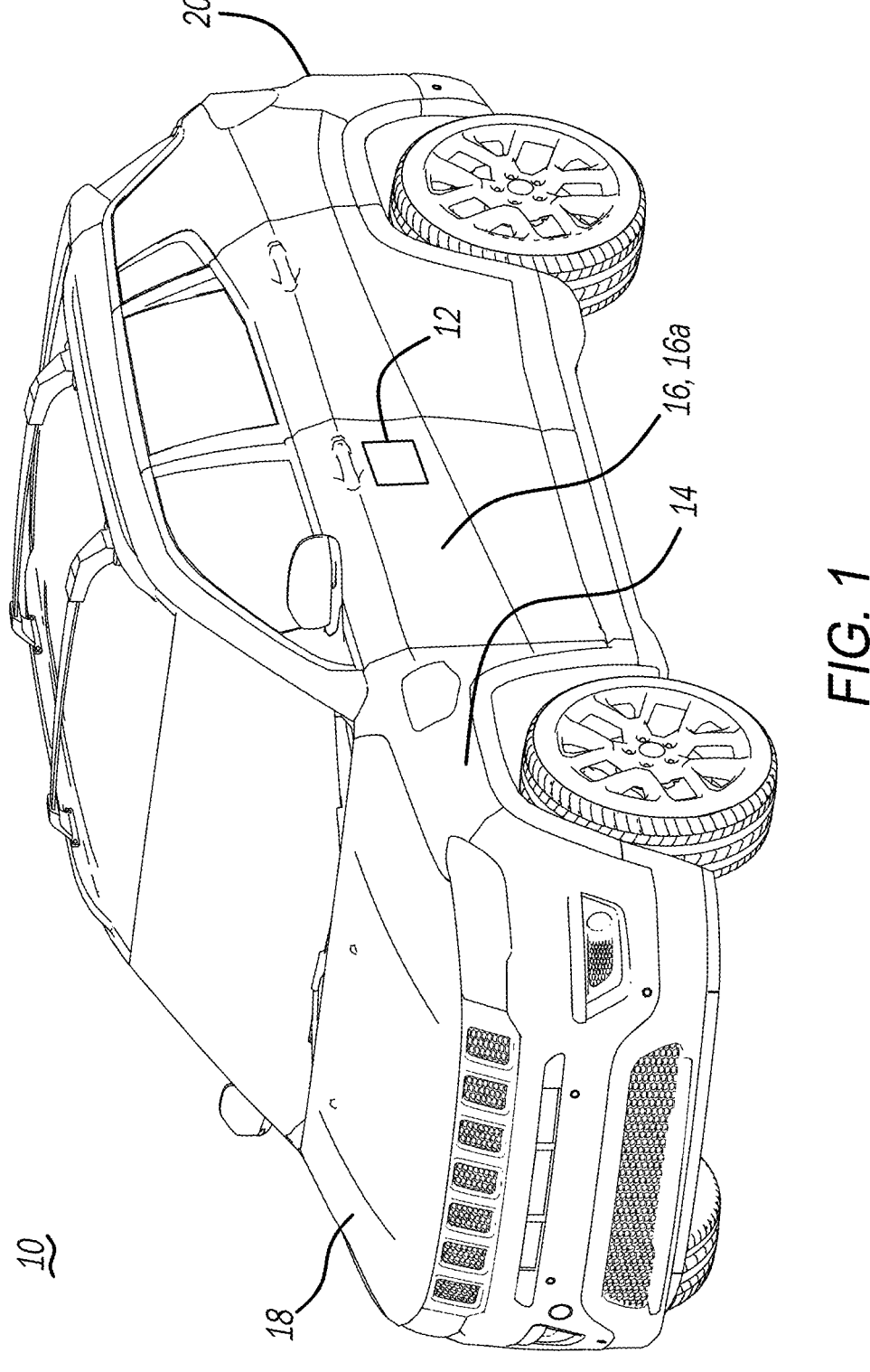
FIG. 1 is a side perspective view of an example vehicle that may include a biometric authentication system according to a principle of the present disclosure.

FIG. 1 illustrates an example vehicle 10 having a biometric authentication system 12 that may be used to, for example, gain access into vehicle 10. Vehicle 10 includes a body 14 and a plurality of doors 16. While authentication system 12 is illustrated as being provided in a driver-side door 16a of vehicle 10, it should be understood that authentication system 12 may be provided at, for example, a different location of vehicle body 14, if desired. In addition, it should be understood that vehicle 10 can include a plurality of authentication systems 12 provided at different locations of vehicle body 14. For example, the vehicle 10 can include the authentication system 12 provided at driver-side door 16a and also include authentication systems 12 provided at a hood 18 or a rear lift-gate 20.

Regardless of the location(s) of authentication system 12, it can be seen in FIG. 1 that authentication system 12 is located on an exterior of vehicle 10 and, therefore, may be exposed to dust, dirt, and moisture (e.g., rain, snow, etc.) that can reduce the effectiveness of authentication system 12 properly identifying an individual that is attempting to gain access into vehicle 10. Accordingly, the present disclosure provides an authentication system 12 that provides protection to a biometric sensor 22 (FIG. 2) such as, for example, a fingerprint sensor from being exposed to dust, dirt, and moisture that can obscure the biometric sensor 22 and reduce its accuracy.

Figure 2:
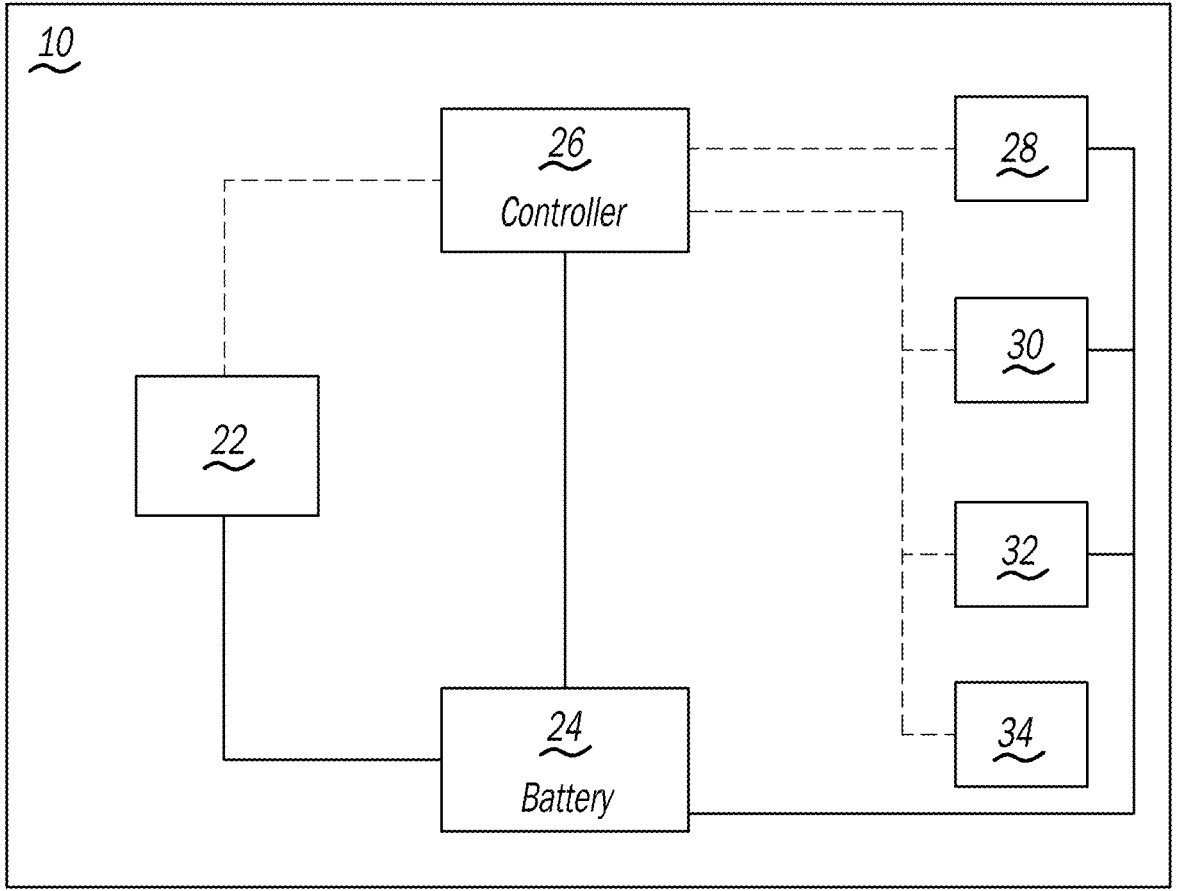
FIG. 2 is a schematic representation of the vehicle illustrated in FIG. 1 including the biometric authentication system according to a principle of the present disclosure.

FIG. 2 schematically illustrates various features of the vehicle 10 illustrated in FIG. 1, including biometric sensor 22. As can be seen in FIG. 2, biometric sensor 22 is in electrical communication with a battery 24 such that biometric sensor 22 can receive electric power therefrom. As noted above, it is desirable that biometric sensor 22 not constantly receive electric power from battery 24. The manner in which biometric sensor 22 receives electric power from battery 24 will be described in more detail later.

Biometric sensor 22 is also in communication with a controller 26, and controller 26 is in communication with various systems of vehicle 10 such as a door lock actuation mechanism 28, an engine control unit (ECU) 30, a vehicle lighting system 32, and a vehicle HVAC system 34. Upon receipt of an authentication signal generated by biometric sensor 22 by controller 26 that the person attempting to enter vehicle 10 is authentic, controller 26 can communicate with door lock actuation mechanism 28 to unlock vehicle doors 16. In other embodiments, in addition to unlocking vehicle doors 16 after receipt of the signal from biometric sensor 22, controller 26 may also communicate with ECU 30 to start an engine (not shown) of vehicle 10, communicate with vehicle lighting system to illuminate a light (not shown) located in a cabin of vehicle 10, and/or communicate with vehicle HVAC system 34 to initiate heating or cooling of the cabin of the vehicle 10.

Figures 3A, 3B:
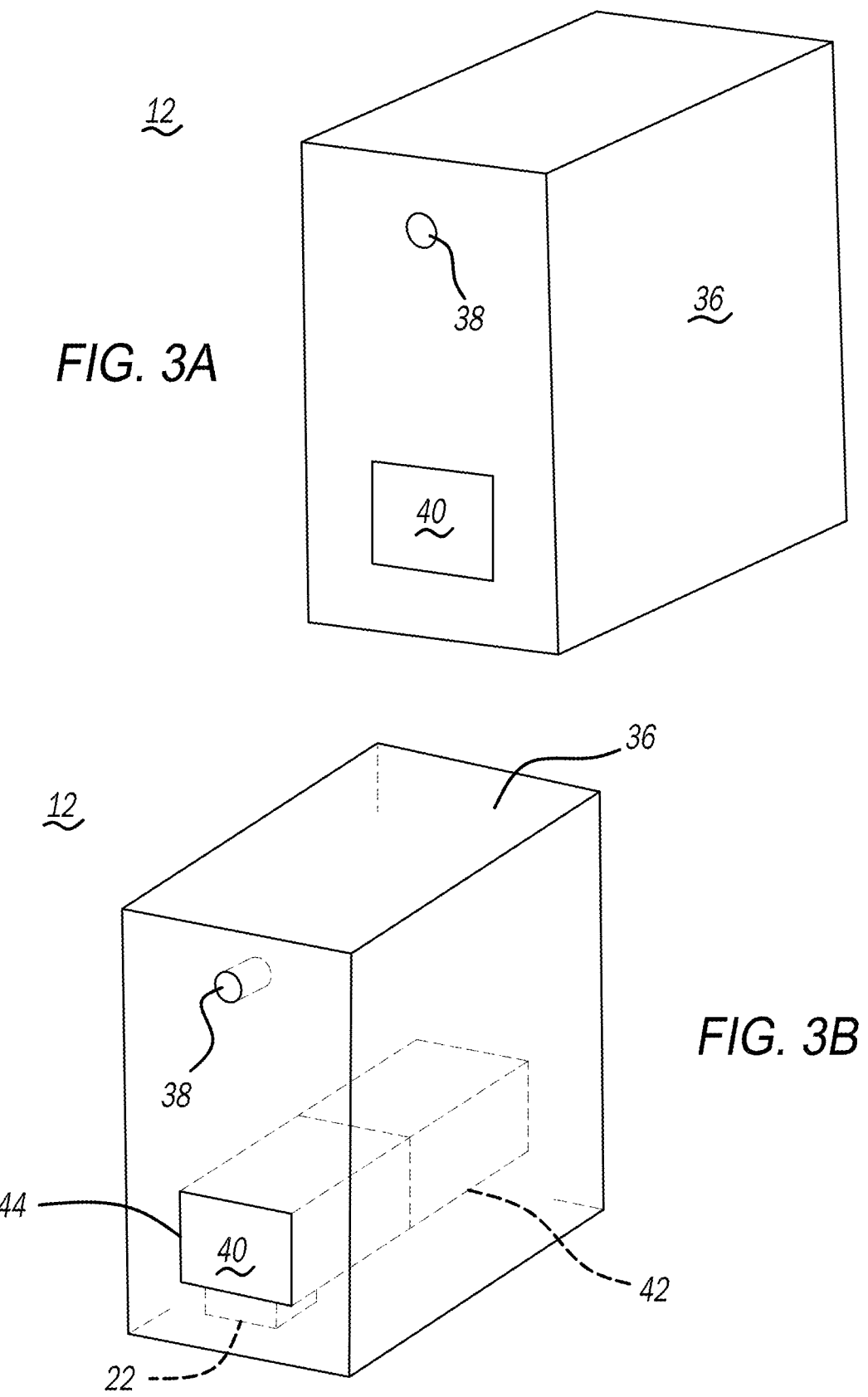
FIGS. 3A-3C are schematic representations of the biometric authentication system according to a principle of the present disclosure.
Figure 3C:
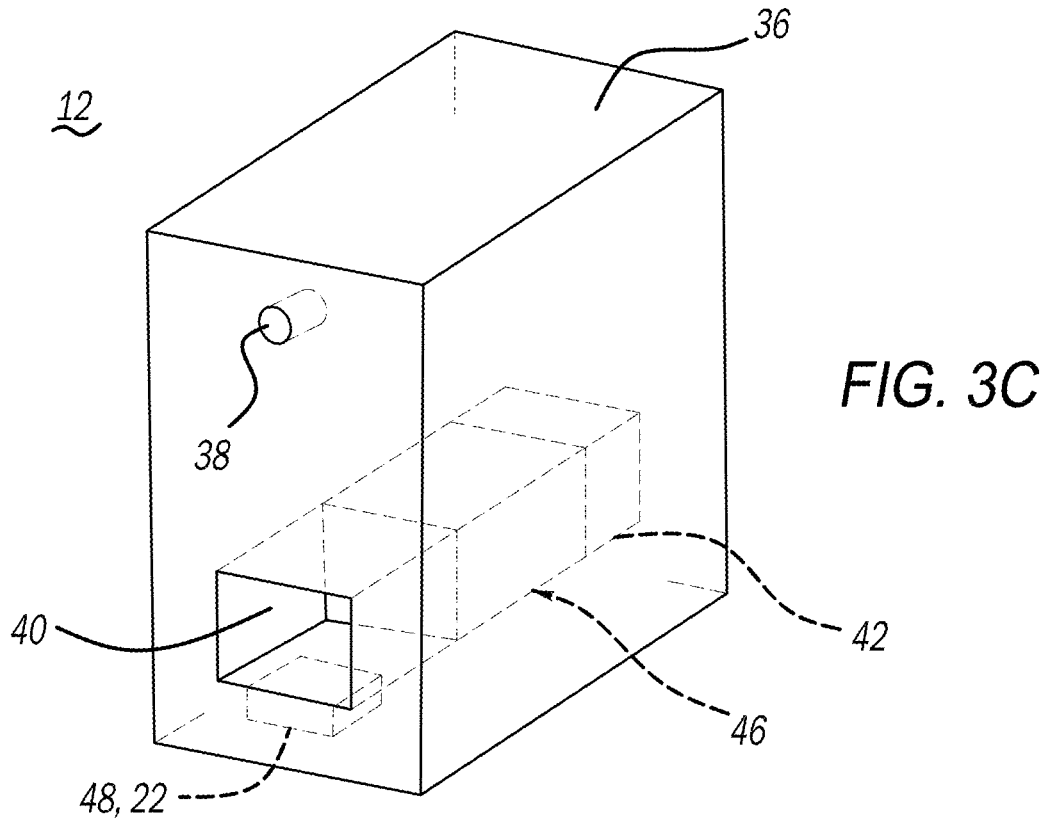
Figure 4:
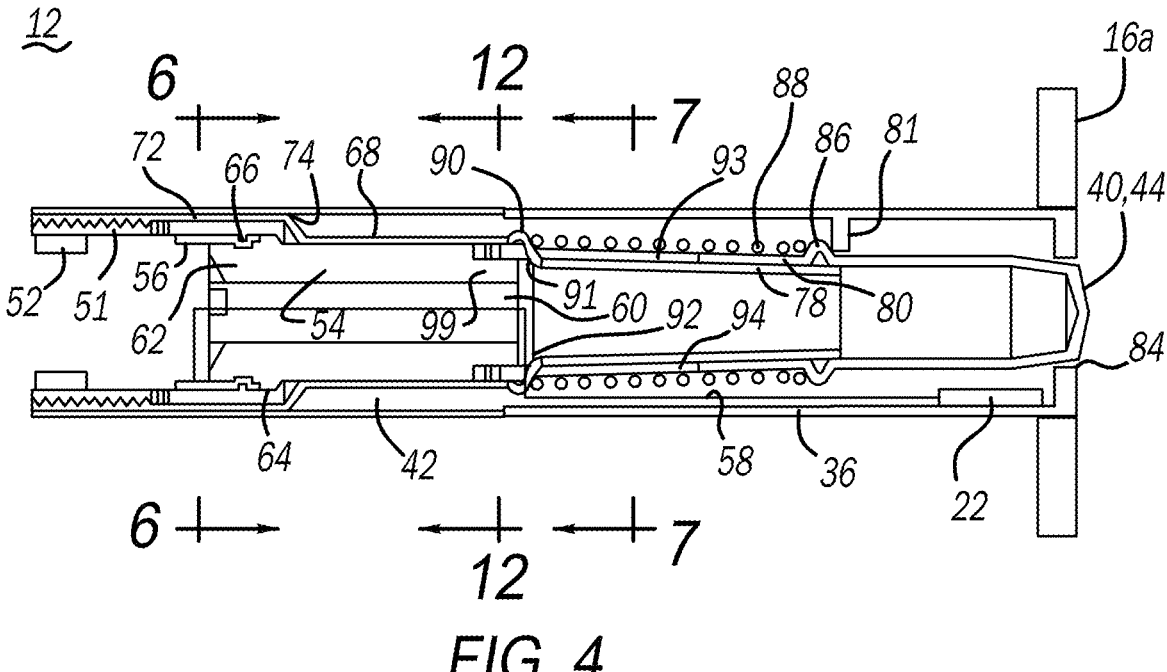
FIG. 4 is a cross-sectional view of an example biometric authentication system according to a principle of the present disclosure having a protection member located at a first position.
Figures 5, 6, 7:
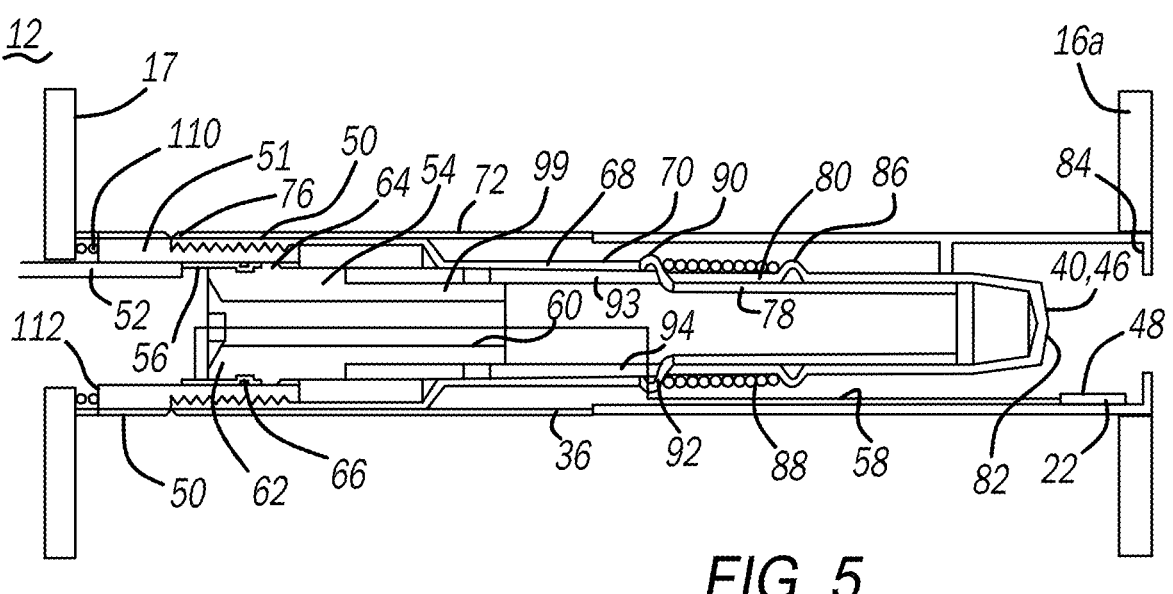
FIG. 5 is a cross-sectional view of the example biometric authentication system shown in FIG. 4 having the protection member located at a second position.
FIG. 6 is a cross-sectional view along line 6-6 in FIG. 4.
FIG. 7 is a cross-sectional view along line 7-7 in FIG. 4.

Now referring to FIGS. 3A, 3B, and 3C, schematic representations of an example authentication system 12 including biometric sensor 22 are illustrated. Authentication system 12 includes a casing 36 that houses biometric sensor 22 and, optionally, a camera 38 that can be used in addition to biometric sensor 22 to authenticate a person attempting to enter vehicle 10. Biometric sensor 22 is protected by a movable protection member 40 that when pressed will expose biometric sensor 22 for use by the person attempting to enter vehicle 10.

As best shown in FIGS. 3B and 3C, protection member 40 is positioned in a cavity 42 defined by casing 36. In a first position 44 shown in FIG. 3B, the protection member 40 prevents the ingress of dust, dirt, and moisture into casing 36 such that biometric sensor 22 cannot be obscured and its accuracy in reading biometric data (e.g., fingerprint) from the person attempting to enter the vehicle 10 can be maintained. In FIG. 3B, in contrast, protection member 40 has been moved to a second position 46 in cavity 42 by the person attempting to authenticate and enter vehicle 10, and a sensing surface 48 of biometric sensor 22 has been exposed so that it may read biometric data (e.g., fingerprint) from the person attempting to enter vehicle 10.

After authenticating using the authentication system 12, the person entering the vehicle 10 may return the protection member 40 back to the first position 44. The manner in which protection member 40 is moved and returned to the first position 44 will be described in more detail later. Regardless, the important aspect to keep in mind is that biometric sensor 22 is protected when not being used.

Now referring to FIGS. 4-15, a more detailed example of authentication system 12 having biometric sensor 22 will be described. Similar to the example embodiment shown in FIGS. 3A-3C, authentication system 12 includes a casing 36 defining a cavity 42, a movable protection member 40, and a biometric sensor 22 that when protection member 40 is moved from first position 44 (FIG. 4) to the second position 46 (FIG. 5) is exposed such that the sensing surface 48 thereof can be contacted by a person attempting to enter vehicle 10. Casing 36 may be coupled to a wiring conduit 50 having a spring-loaded inner sleeve 51 provided in an inner panel 17 of door 16a that includes a first wiring 52 that is in electrical communication with battery 24.

A movement mechanism including a movable cam body 54 that enables protection member 40 to move from the first position 44 to the second position 46 is provided in casing 36, and a second wiring 56 is attached thereto. A wiring line 58 extends between second wiring 56 and biometric sensor 22. When protection member 40 is moved from first position 44 to second position 46, cam body 54 will move in a direction toward wiring conduit 50 and the second wiring 56 attached to cam body 54 will make electrical contact with first wiring 52. Cam body 54 may be provided with a central opening or bore 60 that permits wiring line 58 to pass therethrough and be electrically connected to biometric sensor 22. Second wiring 56 may be secured to cam body 54 by providing a cylindrical end portion 62 of cam body 54 with a radially outwardly extending shoulder 64 that is firmly secured to second wiring 56 by crimping, as indicated at 66.

Upon electrical contact between first wiring 52 and second wiring 56, biometric sensor 22 will be energized by the current or voltage that flows from battery 24, through first wiring 52, second wiring 56, and wiring line 58. When electrical contact between first wiring 52 and second wiring 56 is broken (i.e., when cam body 54 moves away wiring conduit 50), biometric sensor 22 will no longer receive the current or voltage from battery 24. In this manner, biometric sensor 22 is not required to continually receive a current or voltage from battery 24 and will only be energized when authentication system 12 is being accessed by a person attempting to enter vehicle 10.

Cam body 54 is rotatably and slidably disposed within a tubular central portion 68 of a stationary guide member 70 so as to in effect be "floating" therein. The guide member 70 has formed integrally therewith an internally threaded, enlarged, rearwardly extending portion 72 in engagement with an externally threaded end of the spring-loaded sleeve 51. The guide member 70 is secured within the casing 36 as by a soldered joint 74 and a peened-over edge 76 of the casing 36. A reduced diameter portion 78 of guide member 70 serves as an internal guide for a tubular plunger section 80 formed integrally with protection member 40. A contact surface 82 of protection member 40 may be flush with an opening 84 of casing 36, and protection member 40 may be provided with a shoulder 86 for limiting the extent that contact surface 82 can project outward from opening 84. In addition, shoulder 86 may serve as an abutment for a protection member return spring 88 whose other end bears against a shoulder 90 on the guide member 70.

The shoulder 90 may be provided with a pair of radially opposite slots 91 and 92 for receiving respective ones of a pair of diametrically opposite fingers 93 and 94 formed integrally with and extending forwardly from the plunger 80 inside the central, tubular portion 68 of the guide member 70. Two stop members 95 and 96 extend longitudinally within the central portion 68 of the guide member 70, adjacent and parallel with the fingers 93 and 94, respectively. The stop members 95 and 96 may conveniently be formed by a pair of parallel, longitudinal slots (FIGS. 8-12)) provided in an exterior of the central portion 68 of the guide member 70 to form a tab which then is displaced inwardly to depend at its rearward end from the guide member 70.

The cam body 54 is provided with a plurality of cam surfaces 100, 101, 102, 103 diametrically opposite pairs of which are successively engageable by the fingers 93 and 94 to impart unidirectional rotational movement as well as longitudinal reciprocating movement to the cam body 54 when the protection member 40 is repeatedly moved to thereby align alternate cam surfaces 100-103 with the stationary stop members 95 and 96 disposed to abut the cam surfaces 100-103 and bottom surfaces 104, 105 to positively maintain the cam body 54 alternately in projected and retracted positions.

The cam surfaces 100, 101, 102, 103 face toward the opening 84 of casing 36 and are equidistantly spaced from the axis of rotation of the cam body 54 throughout their entire extents. The shapes and relative positions of the cam surfaces 100-103 are better seen in the developed views of the cam body 54 shown in FIGS. 8 to 11. Each of the cam surfaces 100-103 preferably follows a 45-degree helix about the cylindrical cam body 54. The cam surfaces 100-103 are oriented in the same sense (i.e., they are oriented so as to impart a unidirectional rotational movement to the cam body 54 when moved against a rotationally fixed cam actuating device).

Each of the diametrically opposite bottom surfaces 104 and 105 is located axially forwardly of the flanking cam surfaces 100, 102 and 101, 103, respectively. A stop surface 106 extending substantially parallel to the axis of the cam body 54 is disposed between the trailing edge of bottom surface 104 and the leading edge of the cam surface 100. A stop surface 107 is disposed between the trailing edge of cam surface 101 and the leading edge of cam surface 102. Similar stop surfaces 108 and 109 are connected between the trailing edge of bottom surface 105 and the leading edge of cam surface 101 and between the trailing edge of cam surface 100 and the leading edge of cam surface 103, respectively. The cam surfaces 100-103 and bottom surfaces 104-105 taken together are angularly contiguous and stop surfaces 106, 107, 108 and 109 are spaced apart by substantially 90 degrees, the cam surfaces 100 and 101 each being substantially twice as long as each of the cam surfaces 102 and 103 and the bottom surfaces 104 and 105.

In the preferred embodiment illustrated in FIGS. 8 to 11 there are provided two contiguous sets of cam and stop surfaces, each set comprising a bottom surface 104, 105 flanked by cam surfaces 100, 102 and 101, 103, respectively, axially spaced rearwardly thereof. The cam surfaces 100-103 are formed so as to provide a central hub 99 of such diameter as to slidably fit between actuating fingers 93 and 94 and between stationary stop members 95 and 96. Fingers 93 and 94 and stationary stop members 95 and 96 have the respective ends thereof formed at an angle corresponding to that of the cam surfaces 100, 101, 102, and in the same sense. The plunger 80 that is part of protection member 40 is normally biased toward opening 84 by the spring 88, with the shoulder 86 of the plunger 80 abutting the inside forward end of the casing 36 at 81.

Motive power for effecting an axial retracting movement and the rotational movement of the cam body 54 can be accomplished by positioning a spring 110 that is anchored to inner panel 17 of door 16*a* and abuts (i.e., is not connected) a terminal end 112 of sleeve 51 that moves (axially and rotationally) relative to wiring conduit 50 by biasing opposite pairs of cam surfaces 102, 103 or 100, 101 (FIGS. 8 and 10) of the cam body 54 against the stationary stop members 95 and 96, depending on the angular orientation of the sleeve 51 and cylindrical cam body 54 with respect thereto. If the orientation of the cam body 54 within the guide member 70 is such that the stop members 95 and 96 engage the cam surfaces 100 and 101 the sleeve 51 will be moved in a direction away from inner panel 17, while if the orientation of the cam body 54 is such that the stop members 95, 96 will engage bottom surfaces 104 and 105, the cam body 54 and the sleeve 51 will be permitted to extend further into the guide member 70 by a distance equal to the axial distance between the cam surfaces 100, 101 and bottom surfaces 104, 105, wherein the sleeve 51 and cam body 54 will move in a direction away from inner panel 17. Successive full depressions of protection member 40, will, through corresponding movements of actuating fingers 93 and 94, successively depress and rotate the cam body 54 so as to cause alternate pairs of cam surfaces 100, 101 and bottom surfaces 104, 105 to be engaged by the stationary stop members 49 and 96. This, in turn, will cause the sleeve 51 to assume alternately an extended position (i.e., toward inner panel 17) and a retracted position (i.e., away from inner panel 17).

Figures 8, 9, 10:
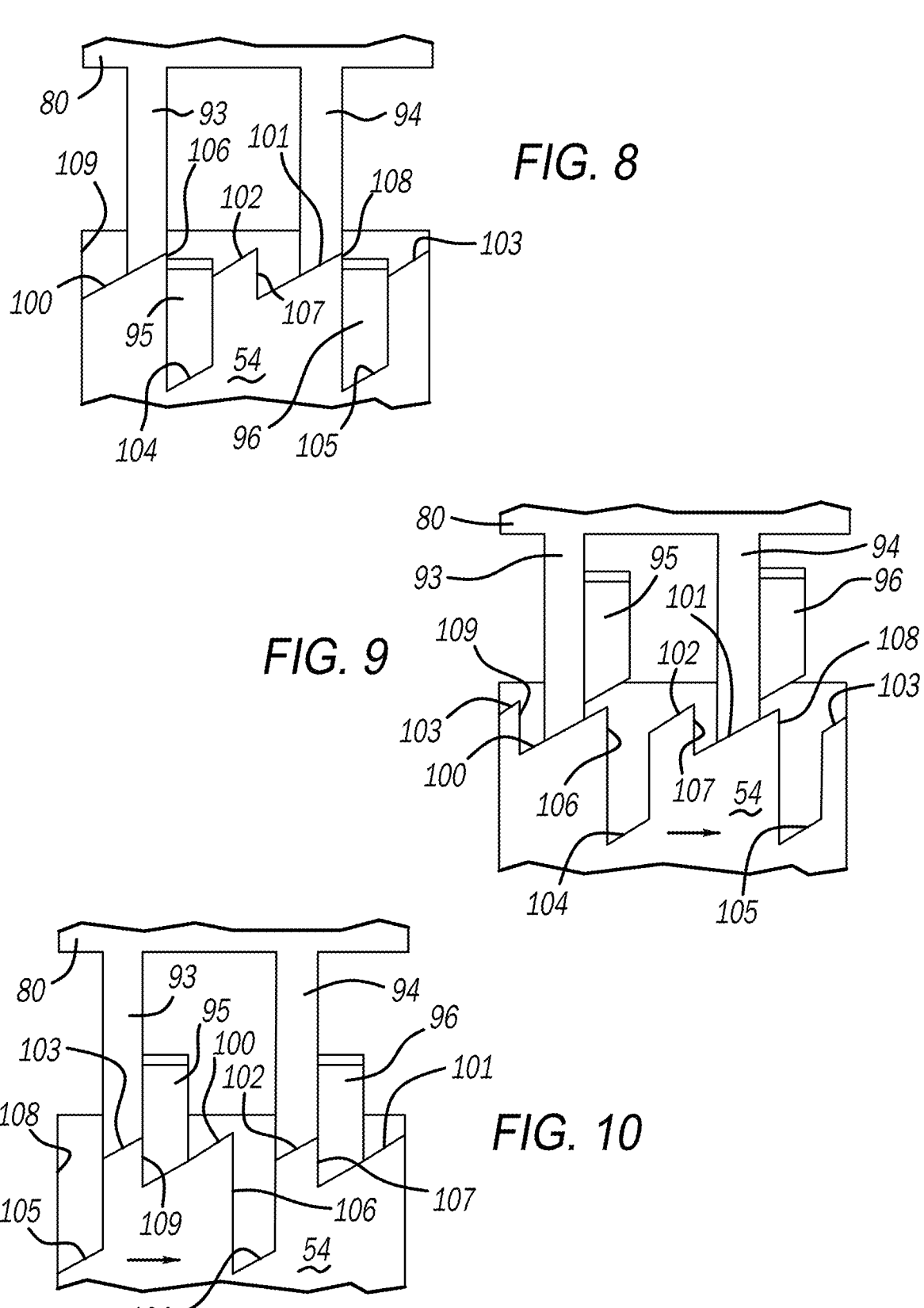
Figures 11, 12, 13:
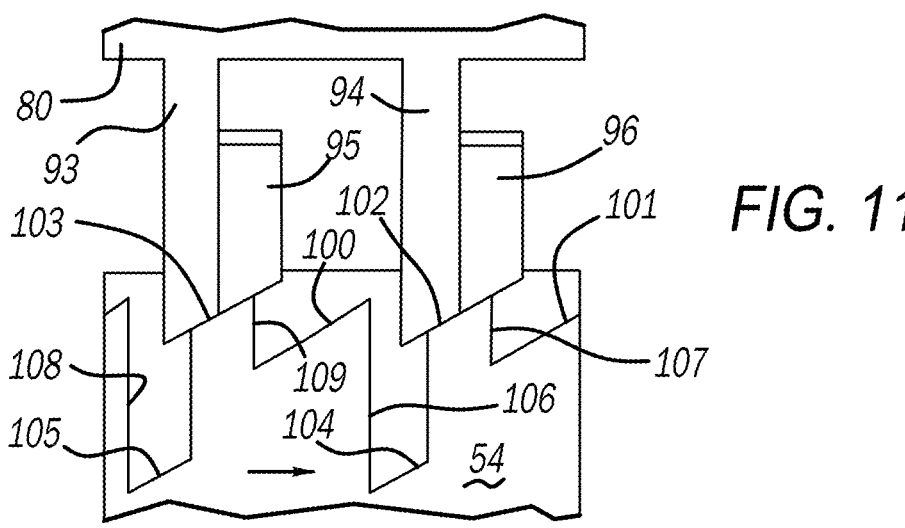
Figure 14:
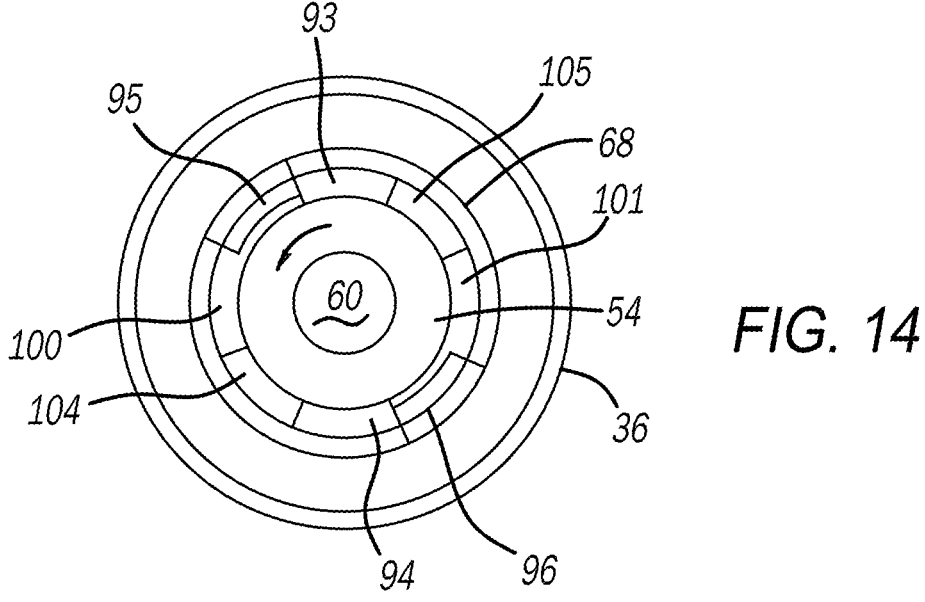
Figure 15:
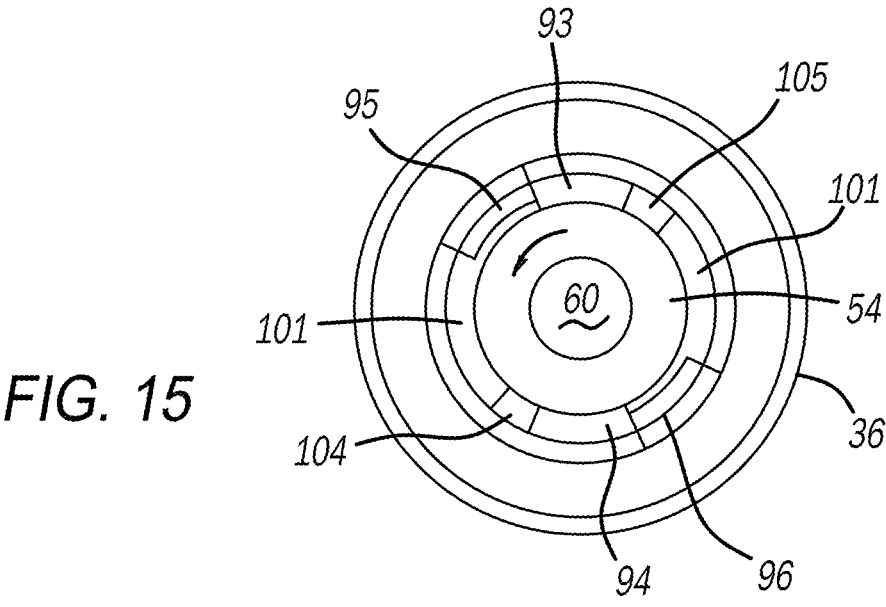

FIG. 12 is a sectional view taken through the guide member 70 and actuating fingers 93 and 94 showing the actual positions of the cam surfaces 100-103 on the cam body 54 with respect to the stationary stop members 95 and 96 and actuating fingers 93 and 94 when the cam body 54 is in its retracted position when the parts are in the positions indicated diagrammatically in FIG. 8. When the protection member 40 is depressed, the actuating fingers 93 and 94 will be moved downwardly (as viewed in FIG. 8) with respect to stationary stop members 95 and 96 and will carry with them the cylindrical cam body 54. The interaction between the camming end portions of fingers 93 and 94 and the cam surfaces 100 and 103, respectively engaged thereby, will tend to rotate the cam body 54 in a clockwise direction and to the right in the developed view of FIG. 8. Such rotational movement of cam body 54 will, however, initially be prevented by the stop surfaces 96 and 98 which bear against the respective stop members 95 and 96.

When the cam body 54 has been depressed to an extent sufficient to permit the rearward edges of stop surfaces 96 and 98 to clear the forward edges of stop members 95 and 96 (FIG. 9), the cam body 54 is free to rotate (in the direction indicated by the arrow) under the influence of the return spring 110 which applies a constant rearward force to the cam body 54 until fingers 93 and 94 abut longitudinally extending stop surfaces 109 and 107, respectively. When the protection member 40 is released and fingers 93 and 94 are withdrawn, the cam body 54 will be free to continue its rotational movement until stop members 95 and 96 abut the longitudinal edges 109 and 107, respectively. The cam body 54 and the sleeve 51 will thus have been rotated through an angle of 90 degrees and will be in their projected positions.

FIG. 10 shows the positions of the operating parts of the projecting-retracting mechanism as the protection member 40 is partly depressed with actuating fingers 93 and 94 in engagement with cam surfaces 103 and 102, respectively.

As the protection member 40 is fully depressed the fingers 93 and 94 are displaced further forwardly and will carry with them the cam body 54 until the stop surfaces 109 and 107 clear the stop members 95 and 96 respectively, at which time the cam body 54 will be free to rotate in a clockwise direction as indicated in FIG. 11. The cam body 54 will continue to rotate until the fingers 93 and 94 engage, respectively, the bottom surfaces 104 and 105 and the top surfaces 108 and 106. The stop members 95 and 96 will now be in alignment with the cam surfaces 103 and 102. When now the protection member 40 is released the fingers 93 and 94 will be retracted and the cam body 54 will be permitted to rotate until stationary stops 95 and 96 engage the stop surfaces 108 and 106, and the bottom surfaces 104 and 105, respectively. The cam body 54 will now again be in its retracted position displaced by one-half a revolution from the corresponding position shown in FIG. 8. It will thus be seen that as protection member 40 is successively depressed and released the cam body 54 and the point-and-cartridge unit 7 will be successively positioned so as to engage the stop members 95 and 46 by the axially displaced pairs of the cam surfaces 100, 101 and bottom surfaces 104, 105 to alternately assume projected and retracted positions.

It is thus seen that the stop members 95, 96 are received alternately, in either retracted or projected position, by either the recess portions (grooves) having the bottom surfaces 104, 105, or the recess portions (grooves) having the cam surfaces 100, 102 as their bottoms.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:

a vehicle body having a door attached thereto for providing access to an interior of the vehicle;

an authentication system attached to the door that is configured to authenticate whether a person is permitted to open the door and access the interior of the vehicle; and a controller in communication with the authentication system and in communication with a door lock actuation mechanism, the controller being configured to actuate the door lock actuation mechanism upon receipt of a signal from the authentication system that is indicative of the person being authentic, wherein the authentication system includes:

a casing attached to the door, a device configured to generate the signal indicative of the person being authentic, and a protection member that is movable relative to the casing and is configured shield the device when the protection member is located at a first position and expose the device when the protection member is at a second and different position, wherein the protection member is configured to receive a first axial force that moves the protection member from the first position to the second position to expose the device, and receive a second axial force that moves the protection member from the second position back to the first position, wherein the vehicle further comprising a battery that is configured to provide a current or a voltage to the device that is configured to generate the signal indicative of the person being authentic;

a wiring conduit attached to the casing and having a first wiring provided therein;

a second wiring attached to the protection member; and a wiring line that connects the second wiring to the device that is configured to generate the signal indicative of the person being authentic, wherein the first wiring is not in electrical contact with the second wiring when the protection member is located at the first position, the first wiring is in electrical communication with the second wiring when the protection member is located at the second position, and when the first wiring is in electrical communication with the second wiring, the current or voltage provided by the battery is communicated to the device by the wiring line.

2. The vehicle according to claim 1, wherein the device configured to generate the signal indicative of the person being authentic is a fingerprint sensor.

3. The vehicle according to claim 1, wherein the protective member is attached to a movement mechanism including a movable cam body that enables the protection member to move from the first position to the second position.

4. The vehicle according to claim 3, wherein the movable cam body is rotatably and axially slidably disposed within a stationary guide member.

5. The vehicle according to claim 4, wherein the protection member includes a plunger section integral therewith, the plunger section having a pair of diametrically opposite fingers formed integrally with the plunger section and extending outward therefrom to engage the movable cam body.

6. The vehicle according to claim 5, wherein the cam body includes a plurality of cam surfaces that are engageable with the pair of fingers.

7. The vehicle according to claim 6, wherein engagement and disengagement of the pair of fingers with a pair of the plurality of cam surfaces axially displaces and rotates the movable cam body.

8. An authentication system configured to be attached to a door and configured to authenticate whether a person is permitted to open the door, the authentication system comprising:

a casing configured to be attached to the door, a device configured to generate a signal indicative of the person being authentic, and a protection member that is movable relative to the casing and is configured shield the device when the protection member is located at a first position and expose the device when the protection member is at a second and different position, wherein the protection member is configured to receive a first axial force that moves the protection member from the first position to the second position to expose the device, and receive a second axial force that moves the protection member from the second position back to the first position, wherein the device that is configured to generate the signal indicative of the person being authentic is in electrical communication with a battery when the protection member is in the second position, wherein the authentication system further comprising a wiring conduit attached to the casing and having a first wiring provided therein;

a second wiring attached to the protection member; and a wiring line that connects the second wiring to the device that is configured to generate the signal indicative of the person being authentic, wherein the first wiring is not in electrical contact with the second wiring when the protection member is located at the first position, the first wiring is in electrical communication with the second wiring when the protection member is located at the second position, and when the first wiring is in electrical communication with the second wiring, the current or voltage provided by the battery is communicated to the device by the wiring line.

9. The authentication system according to claim 8, wherein the device configured to generate the signal indicative of the person being authentic is a fingerprint sensor.

10. The authentication system according to claim 8, wherein the protective member is attached to a movement mechanism including a movable cam body that enables the protection member to move from the first position to the second position.

11. The authentication system according to claim 10, wherein the movable cam body is rotatably and axially slidably disposed within a stationary guide member.

12. The authentication system according to claim 11, wherein the protection member includes a plunger section integral therewith, the plunger section having a pair of diametrically opposite fingers formed integrally with the plunger section and extending outward therefrom to engage the movable cam body.

13. The authentication system according to claim 12, wherein the cam body includes a plurality of cam surfaces that are engageable with the pair of fingers.

14. The authentication system according to claim 13, wherein engagement and disengagement of the pair of fingers with a pair of the plurality of cam surfaces axially displaces and rotates the movable cam body.

* * * * *